(12) United States Patent
Jeon et al.

(10) Patent No.: US 11,186,661 B2
(45) Date of Patent: Nov. 30, 2021

(54) METHOD FOR PREPARING MODIFIED CONJUGATED DIENE-BASED POLYMER

(71) Applicant: LG Chem, Ltd., Seoul (KR)

(72) Inventors: Hee Jung Jeon, Daejeon (KR); Kyoung Hwan Oh, Daejeon (KR); Jeong Heon Ahn, Daejeon (KR); Suk Youn Kang, Daejeon (KR)

(73) Assignee: LG Chem, Ltd.

( * ) Notice: Subject to any disclaimer, the term of this patent is extended or adjusted under 35 U.S.C. 154(b) by 113 days.

(21) Appl. No.: 16/481,573

(22) PCT Filed: Jul. 26, 2018

(86) PCT No.: PCT/KR2018/008489
§ 371 (c)(1),
(2) Date: Jul. 29, 2019

(87) PCT Pub. No.: WO2019/078459
PCT Pub. Date: Apr. 25, 2019

(65) Prior Publication Data
US 2019/0389987 A1    Dec. 26, 2019

(30) Foreign Application Priority Data

Oct. 18, 2017 (KR) ........................ 10-2017-0135175

(51) Int. Cl.
| | |
|---|---|
| *C08F 136/06* | (2006.01) |
| *C08F 36/04* | (2006.01) |
| *C08F 4/54* | (2006.01) |
| *C08C 19/22* | (2006.01) |
| *C08F 136/04* | (2006.01) |
| *C08F 8/30* | (2006.01) |
| *C08F 2/38* | (2006.01) |
| *C08F 36/06* | (2006.01) |
| *C08F 36/14* | (2006.01) |
| *C08C 19/25* | (2006.01) |
| *C08K 5/544* | (2006.01) |
| *C08C 19/20* | (2006.01) |
| *C08F 8/38* | (2006.01) |

(52) U.S. Cl.
CPC ............ *C08F 136/06* (2013.01); *C08C 19/22* (2013.01); *C08C 19/25* (2013.01); *C08F 2/38* (2013.01); *C08F 4/54* (2013.01); *C08F 4/545* (2013.01); *C08F 8/30* (2013.01); *C08F 36/04* (2013.01); *C08F 36/06* (2013.01); *C08F 36/14* (2013.01); *C08F 136/04* (2013.01); *C08K 5/544* (2013.01); *C08C 19/20* (2013.01); *C08F 8/38* (2013.01)

(58) Field of Classification Search
CPC ......... C08C 19/20; C08C 19/25; C08C 19/22; C08F 4/54; C08F 36/14; C08F 136/06; C08F 36/04; C08F 136/04; C08F 2/38; C08F 8/30; C08F 8/38; C08F 36/06; C08F 5/545; C08K 5/544

See application file for complete search history.

(56) References Cited

U.S. PATENT DOCUMENTS

| | | |
|---|---|---|
| 5,567,784 A | 10/1996 | Wieder et al. |
| 6,030,987 A | 2/2000 | Silverman et al. |
| 2009/0099325 A1 | 4/2009 | Luo et al. |
| 2010/0280217 A1 | 11/2010 | Luo et al. |
| 2010/0317818 A1 | 12/2010 | Hogan et al. |
| 2012/0059112 A1 | 3/2012 | Luo et al. |
| 2013/0340912 A1 | 12/2013 | Zhao |
| 2015/0252126 A1 | 9/2015 | Kloppenburg et al. |
| 2016/0237259 A1 | 8/2016 | Hardy et al. |
| 2016/0257770 A1 | 9/2016 | Kloppenburg et al. |
| 2018/0312669 A1* | 11/2018 | Kang ................ C08F 36/04 |

FOREIGN PATENT DOCUMENTS

| | | |
|---|---|---|
| CN | 101874044 A | 10/2010 |
| CN | 102361887 A | 2/2012 |
| CN | 104395351 A | 3/2015 |
| EP | 2412731 A1 | 2/2012 |
| EP | 2819853 A1 | 1/2015 |
| JP | 3175350 B2 | 6/2001 |
| JP | 2008274067 A | 11/2008 |
| JP | 2010530464 A | 9/2010 |
| JP | 2014058480 A | 4/2014 |
| JP | 2015524018 A | 8/2015 |
| JP | 2015533849 A | 11/2015 |
| JP | 2016535130 A | 11/2016 |
| JP | 2016539213 A | 12/2016 |
| KR | 20100091969 A | 8/2010 |
| KR | 20150022836 A | 3/2015 |
| KR | 20160079811 A | 7/2016 |

(Continued)

OTHER PUBLICATIONS

Extended European Search Report for EP18867903 dated Sep. 25, 2020; 5 pages.
Zasukha SV, Novak OV, Guzyr OI, Shermolovich YG. The first synthesis of chiral dialkylamines with a, a-difluoroethers fragments. Journal of Fluorine Chemistry. Mar. 24, 2016;185:197-200.

(Continued)

*Primary Examiner* — Angela C Scott
(74) *Attorney, Agent, or Firm* — Lerner, David, Littenberg, Krumholz & Mentlik, LLP

(57) ABSTRACT

A method for preparing a modified conjugated diene-based polymer having excellent compounding properties and improved processability is disclosed herein. According to the method, a first polymer including a functional group is prepared using a modifier represented by Formula 1, and the first polymer is mixed with a sulfur halide. A modified conjugated diene-based polymer having excellent affinity with a filler, excellent compounding properties such as tensile properties and viscoelasticity properties, and excellent compounding processability, may be prepared.

12 Claims, No Drawings

(56) References Cited

FOREIGN PATENT DOCUMENTS

KR 20160086853 A 7/2016
WO WO-2018008911 A1 * 1/2018 ................ C08F 4/44

OTHER PUBLICATIONS

International Search Report for PCT/KR2018/008489 dated Oct. 29, 2018.
Chinese Search Report for Application No. 201880010506.7 dated Jul. 2, 2021, 2 pages.

* cited by examiner

METHOD FOR PREPARING MODIFIED CONJUGATED DIENE-BASED POLYMER

CROSS-REFERENCE TO RELATED APPLICATIONS

The present application is a national phase entry under 35 U.S.C. § 371 of International Application No. PCT/KR2018/008489, filed on Jul. 26, 2018, which claims priority from Korean Patent Application No. 10-2017-0135175, filed on Oct. 18, 2017, the entire contents of which are incorporated herein by reference.

TECHNICAL FIELD

The present invention relates to a method for preparing a modified conjugated diene-based polymer having excellent compounding properties and improved processability.

BACKGROUND ART

According to the recent demand for cars having a low fuel consumption ratio, a conjugated diene-based polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires.

In case where the BR or SBR is used as a rubber material for tires, generally, a filler such as silica and carbon black is blended and used to attain the physical properties required for tires. However, since the affinity of the BR or SBR filler is not good, physical properties such as abrasion resistance, crack resistance and processability are rather degraded.

Accordingly, as a method for improving the dispersibility of SBR with a filler such as silica and carbon black, a method of modifying the polymerization active part of a conjugated diene-based polymer obtained by anionic polymerization using an organolithium with a functional group that may interact with the filler, has been suggested. For example, a method of modifying the polymerization active terminal of a conjugated diene-based polymer with a tin-based compound, a method of introducing an amino group, or a method of modifying with an alkoxysilane derivative has been suggested.

In addition, as a method for improving the dispersibility of BR with a filler such as silica and carbon black, a method of modifying a living active terminal with a specific coupling agent or a modifier in a living polymer obtained by coordination polymerization using a catalyst composition including a lanthanide rare earth element compound, has been developed.

Meanwhile, a terminal modified-polymer has the merits of achieving improved affinity with a filler and improved compounding properties, for example, tensile properties and viscoelasticity properties, but demerits of showing largely decreased compounding processability and poor processability.

Accordingly, a method that may achieve excellent compounding properties and improving processability during preparing SBR or BR, is required.

DISCLOSURE OF THE INVENTION

Technical Problem

The present invention has been devised to solve the above-mentioned problems of the conventional technique, and an object of the present invention is to provide a method for preparing a modified conjugated diene-based polymer having excellent compounding properties and improved processability.

Technical Solution

To solve the above-described tasks, there is provided in the present invention a method for preparing a modified conjugated diene-based polymer including a step of polymerizing a conjugated diene-based monomer in the presence of a catalyst composition in a hydrocarbon solvent to prepare an active polymer (step 1); a step of reacting the active polymer with a modifier represented by the following Formula 1 to prepare a first polymer (step 2); and a step of adding a sulfur halide to the first polymer and mixing for 15 minutes or more (step 3):

[Formula 1]

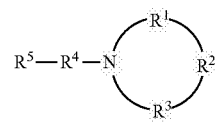

in Formula 1, $R^1$ to $R^3$ are each independently a trivalent hydrocarbon group substituted with one or more substituents selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$; or an unsubstituted divalent hydrocarbon group of 1 to 10 carbon atoms, where all $R^1$ to $R^3$ are not trivalent hydrocarbon groups; or divalent hydrocarbon groups at the same time, $R^4$ is a single bond, an alkylene group of 1 to 20 carbon atoms, or a cycloalkylene group of 3 to 20 carbon atoms, $R^5$ is a silyl group that is unsubstituted or substituted with an alkyl group of 1 to 20 carbon atoms; halogen; a cyano group; or —$COR^8$, $R^6$ is a single bond, an alkylene group of 1 to 20 carbon atoms, or a cycloalkylene group of 3 to 20 carbon atoms, $R^7$ is an alkyl group of 1 to 20 carbon atoms, or a cycloalkyl group of 3 to 20 carbon atoms, and $R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms and a disilylamino group of 3 to 10 carbon atoms.

Advantageous Effects

According to the preparation method of the present invention, a modified conjugated diene-based polymer having excellent affinity with a filler, excellent compounding properties such as tensile properties and viscoelasticity properties, high degree of branching, and excelling compounding processability may be prepared by preparing a first polymer including a functional group using a modifier represented by Formula 1, and mixing the first polymer with a sulfur halide.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the concept of the words to best explain the invention.

The present invention provides a method for preparing the modified conjugated diene-based polymer having excellent compounding properties such as tensile properties and viscoelasticity properties and high degree of branching, so as to prepare a modified conjugated diene-based polymer having improved compounding processability.

The method for preparing a modified conjugated diene-based polymer according to an embodiment of the present invention is characterized in including polymerizing a conjugated diene-based monomer in the presence of a catalyst composition in a hydrocarbon solvent to prepare an active polymer (step 1); reacting the active polymer with a modifier represented by the following Formula 1 to prepare a first polymer (step 2); and adding a sulfur halide to the first polymer and mixing for 15 minutes or more (step 3):

[Formula 1]

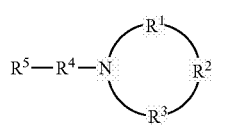

in Formula 1, $R^1$ to $R^3$ are each independently a trivalent hydrocarbon group substituted with one or more substituents selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$; or an unsubstituted divalent hydrocarbon group of 1 to 10 carbon atoms, where all $R^1$ to $R^3$ are not trivalent hydrocarbon groups; or divalent hydrocarbon groups at the same time, $R^4$ is a single bond, an alkylene group of 1 to 20 carbon atoms, or a cycloalkylene group of 3 to 20 carbon atoms, $R^5$ is a silyl group that is unsubstituted or substituted with an alkyl group of 1 to 20 carbon atoms; halogen; a cyano group; or —$COR^8$, $R^6$ is a single bond, an alkylene group of 1 to 20 carbon atoms, or a cycloalkylene group of 3 to 20 carbon atoms, $R^7$ is an alkyl group of 1 to 20 carbon atoms, or a cycloalkyl group of 3 to 20 carbon atoms, and $R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms and a disilylamino group of 3 to 10 carbon atoms.

In the present invention, the term "trivalent hydrocarbon group substituted with a substituent" may represent a tri-substituted hydrocarbon group from the bond (divalent) in a ring including an N atom and the bond (monovalent) with the above-defined substituent, and the substituted trivalent hydrocarbon group may be a trivalent hydrocarbon group of 1 to 10, or 1 to 5 carbon atoms for forming a ring with the N atom, excluding the carbon number of the above-defined substituent.

In the present invention, the term "single bond" may mean a single covalent bond itself without a separate atom or molecule group.

In the present invention, the term "silyl group unsubstituted or substituted with an alkyl group of 1 to 20 carbon atoms" may mean one selected from the group consisting of an unsubstituted monovalent silyl group and divalent to tetravalent silyl groups substituted with the alkyl group.

Step 1 is a step for preparing an active polymer including an activated organometal part, derived from the catalyst composition, and may be performed by polymerizing a conjugated diene-based monomer in the presence of a catalyst composition in a hydrocarbon solvent.

The conjugated diene-based monomer is not specifically limited, and may be, for example, one or more selected from the group consisting of 1,3-butadiene, 2,3-dimethyl-1,3-butadiene, piperylene, 3-butyl-1,3-octadiene, isoprene and 2-phenyl-1,3-butadiene.

The hydrocarbon solvent is not specifically limited, and may be, for example, one or more selected from the group consisting of n-pentane, n-hexane, n-heptane, isooctane, cyclohexane, toluene, benzene and xylene.

The catalyst composition may include a lanthanide rare earth element-containing compound.

The catalyst composition may use the lanthanide rare earth element-containing compound in an amount of 0.1 mmol to 0.5 mmol based on total 100 g of the conjugated diene-based monomer, particularly, the lanthanide rare earth element-containing compound may be used in an amount of 0.1 mmol to 0.4 mmol based on total 100 g of the conjugated diene-based monomer, more particularly, in an amount of 0.1 mmol to 0.25 mmol.

The lanthanide rare earth element-containing compound is not specifically limited, but may be a compound of one or two or more among rare earth metals with atomic number of 57 to 71 such as lanthanum, neodymium, cerium, gadolinium and praseodymium, more particularly, a compound including one or more selected from the group consisting of neodymium, lanthanum and gadolinium.

In addition, the lanthanide rare earth element-containing compound may include the rare earth element-containing carboxylates (for example, neodymium acetate, neodymium acrylate, neodymium methacrylate, neodymium gluconate, neodymium citrate, neodymium fumarate, neodymium lactate, neodymium maleate, neodymium oxalate, neodymium 2-ethylhexanoate, neodymium neodecanoate, etc.), organic phosphates (for example, neodymium dibutyl phosphate, neodymium dipentyl phosphate, neodymium dihexyl phosphate, neodymium diheptyl phosphate, neodymium dioctyl phosphate, neodymium bis(1-methyl heptyl) phosphate, neodymium bis(2-ethylhexyl) phosphate, neodymium didecyl phosphate, etc.), organic phosphonates (for example, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, etc.), organic phosphinates (for example, neodymium butyl phosphinate, neodymium pentyl phosphinate, neodymium hexyl phosphinate, neodymium heptyl phosphinate, neodymium octyl phosphinate, neodymium (1-methyl heptyl) phosphinate, neodymium (2-ethylhexyl) phosphinate, etc.), carbamates (for example, neodymium dimethyl carbamate, neodymium diethyl carbamate, neodymium diisopropyl carbamate, neodymium dibutyl carbamate, neodymium dibenzyl carbamate, etc.), dithio carbamates (for example, neodymium dimethyldithio carbamate, neodymium diethyldithio carbamate, neodymium diisopropyl dithio carbamate, neodymium dibutyldithio carbamate, etc.), xanthogenates (for example, neodymium methyl xanthogenate, neodymium ethyl xanthogenate, neodymium isopropyl xanthogenate, neodymium butyl xanthogenate, neodymium benzyl xanthogenate, etc.), β-diketonates (for example, neodymium acetylacetonate, neodymium trifluoroacetyl acetonate, neodymium hexafluoroacetyl acetonate, neodymium benzoyl acetonate, etc.), alkoxides or allyloxides (for example, neodymium methoxide, neodymium ethoxide, neodymium isopropoxide, neodymium phenoxide, neodymium nonyl phenoxide, etc.), halides or pseudo halides (neodymium fluoride, neodymium chloride, neodymium bromide, neodymium iodide, neodymium cyanide, neodymium cyanate, neodymium thiocyanate, neodymium azide, etc.), oxyhalides (for example, neodymium oxyfluoride, neodymium oxychloride, neodymium oxybromide, etc.); or organic lanthanide rare earth element-containing compounds including at least one rare earth element-carbon bond (for example, $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, $Ln(allyl)_2Cl$, etc., where Ln is a rare earth metal element, and R is a hydrocarbyl group), etc. and may include any one or a mixture of two or more thereof.

Particularly, the lanthanide rare earth element-containing compound may include a neodymium compound represented by the following Formula 3:

[Formula 3]

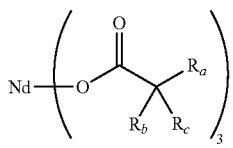

In Formula 3, $R_a$ to $R_c$ are each independently hydrogen or an alkyl group of 1 to 12 carbon atoms, where all $R_a$ to $R_c$ are not hydrogen at the same time.

More particularly, the neodymium compound may be one or more selected from the group consisting of Nd(2-ethylhexanoate)$_3$, Nd(2,2-dimethyl decanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$.

In addition, in another embodiment, with regard to excellent solubility on a solvent without fear of oligomerization and conversion ratio to catalytically active species, and consequential excellent improving effect of catalyst activity, the lanthanide rare earth element-containing compound may be a neodymium-based compound, more particularly, Formula 3 where $R_a$ is an alkyl group of 4 to 12 carbon atoms, and $R_b$ and $R_c$ are each independently hydrogen or an alkyl group of 2 to 8 carbon atoms, where $R_b$ and $R_c$ are not hydrogen at the same time.

In a more particular embodiment, in Formula 3, $R_a$ may be an alkyl group of 6 to 8 carbon atoms, and $R_b$ and $R_c$ may be each independently hydrogen or an alkyl group of 2 to 8 carbon atoms, where $R_b$ and $R_c$ may not be hydrogen at the same time, and the particular examples thereof may include one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$, and among them, the neodymium compound may be one or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

More particularly, in Formula 3, $R_a$ may be an alkyl group of 6 to 8 carbon atoms, and $R_b$ and $R_c$ may be each independently an alkyl group of 2 to 6 carbon atoms.

As described above, the neodymium compound represented by Formula 3 includes a carboxylate ligand containing an alkyl group having various lengths of two or more carbon atoms at an α (alpha) position as a substituent, and steric change may be induced around a neodymium central metal to block the tangling among compounds, and as a result, the restraining effect of oligomerization may be achieved. Also, such a neodymium compound has high solubility in a solvent, and the ratio of neodymium positioned at the central part, which has difficulty in conversion into a catalyst active species, is decreased, and thus, a conversion ratio into the catalyst active species is high.

In addition, the lanthanide rare earth element-containing compound according to an embodiment of the present invention may have a solubility of about 4 g or more per 6 g of a non-polar solvent at room temperature (25° C.)

In the present invention, the solubility of the neodymium compound means the degree of clear dissolution without generating turbid phenomenon. Through such a high solubility, excellent catalyst activity may be attained.

In addition, the lanthanide rare earth element-containing compound according to an embodiment of the present invention may be used as a reaction product type with a Lewis base. The reaction product may improve the solubility of the lanthanide rare earth element-containing compound in a solvent by the Lewis base and may have stable storing effect for a long time. In an embodiment, the Lewis base may be used in a ratio of 30 mol or less, or 1 to 10 mol per 1 mol of a rare earth element. The Lewis base may be, for example, acetyl acetone, tetrahydrofuran, pyridine, N,N-dimethylformamide, thiophene, diphenyl ether, triethylamine, organophosphorous compounds or monohydric or dihydric alcohols.

Meanwhile, the catalyst composition may further include at least one of an alkylating agent, a halide and a conjugated diene-based monomer together with the lanthanide rare earth element-containing compound.

That is, the catalyst composition according to an embodiment of the present invention includes the lanthanide rare earth element-containing compound, and may further include at least one of an alkylating agent, a halide and a conjugated diene-based monomer.

Hereinafter, (a) the alkylating agent, (b) the halide and (c) the conjugated diene-based monomer will be explained in particular, separately.

(a) Alkylating Agent

The alkylating agent is an organometallic compound which is capable of delivering a hydrocarbyl group to another metal, and plays the role of a co-catalyst. Any alkylating agents used for the preparation of a common diene-based polymer may be used as the alkylating agent, without specific limitation. For example, any organometallic compound that is soluble in a polymer solvent and includes a metal-carbon bond such as organoaluminum compounds, organomagnesium compounds and organolithium compounds may be used.

Particularly, the organoaluminum compound may include alkyl aluminums such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; dihydrocarbylaluminum hydrides such as diethylaluminum hydride, di-n-propylaluminum hydride, diisopropylaluminum hydride, di-n-butylaluminum hydride, diisobutylaluminum hydride (DIBAH), di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride and benzyl-n-octylaluminum hydride; hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride, or the like. The organomagnesium compound may include alkylmagnesium compounds such as diethylmagnesium, di-n-propylmagnesium, diisopropylmagnesium, dibutylmagnesium, dihexylmagnesium, diphenylmagnesium and dibenzylmagnesium, and the organolithium compound may include alkyl lithium compounds such as n-butyllithium.

In addition, the organoaluminum compound may include aluminoxanes.

The aluminoxane may be prepared by reacting trihydrocarbyl aluminum-based compounds with water, and may particularly be linear aluminoxanes of the following Formula 4a or circular aluminoxanes of the following Formula 4b:

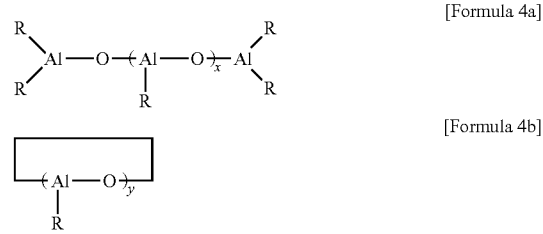

[Formula 4a]

[Formula 4b]

In Formulae 4a and 4b, R is a monovalent organic group which is combined with an aluminum atom via a carbon atom, and may be a hydrocarbyl group, and x and y are each independently an integer of 1 or more, particularly, an integer of 1 to 100, and more particularly, 2 to 50.

More particularly, the aluminoxane may be, methylaluminoxane (MAO), modified methylaluminoxane (MAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane or 2,6-dimethylphenyl aluminoxane, and any one or a mixture of two or more thereof may be used.

In addition, the modified methylaluminoxane is obtained by substituting the methyl group of the methylaluminoxane with a modifier (R), particularly, a hydrocarbon group of 2 to 20 carbon atoms, and particularly, may be a compound of the following Formula 5:

[Formula 5]

In Formula 5, R is the same as defined above, and m and n may be each independently an integer of 2 or more. In addition, in Formula 5, Me represents a methyl group.

Particularly, R in the above Formula 5 may be an alkyl group of 2 to 20 carbon atoms, a cycloalkyl group of 3 to 20 carbon atoms, an alkenyl group of 2 to 20 carbon atoms, a cycloalkenyl group of 3 to 20 carbon atoms, an aryl group of 6 to 20 carbon atoms, an arylalkyl group of 7 to 20 carbon atoms, an alkylaryl group of 7 to 20 carbon atoms, an allyl group, or an alkynyl group of 2 to 20 carbon atoms, and more particularly, may be an alkyl group of 2 to 10 carbon atoms such as an ethyl group, an isobutyl group, a hexyl group and an octyl group, and even more particularly, may be an isobutyl group.

More particularly, the modified methylaluminoxane may be obtained by substituting about 50 mol % to 90 mol % of the methyl group of the methylaluminoxane with the hydrocarbon group. When the amount of the substituted hydrocarbon group in the modified methylaluminoxane is in the range, alkylation may be promoted, and catalytic activity may increase.

Such modified methylaluminoxane may be prepared by a common method, and particularly, may be prepared using trimethylaluminum and an alkylaluminum other than trimethylaluminum. In this case, the alkylaluminum may be triisobutylaluminum, triethylaluminum, trihexylaluminum, or trioctylaluminum, and any one or a mixture of two or more thereof may be used.

In addition, the catalyst composition according to an embodiment of the present invention may include the alkylating agent in a molar ratio of 1 to 200 mol, particularly, 1 to 100 mol, more particularly, 3 to 20 mol with respect to 1 mol of the lanthanide rare earth element-containing compound. If greater than 200 mol of the alkylating agent is included, the control of catalyst reaction during preparing a polymer is not easy, and the excessive amount of the alkylating agent may induce side reactions.

(b) Halide

Examples of the halide are not specifically limited, and the halide may be a diatomic halogen, an interhalogen compound, hydrogen halide, organic halide, nonmetal halide, metal halide, or organometallic halide, etc., and one or a mixture of two or more thereof may be used. Among them, in consideration of the improvement of catalytic activity and consequent improving effect of reactivity, the halide may be one selected from the group consisting of organic halide, metal halide and organometallic halide, or a mixture of two or more thereof.

The diatomic halogen may include fluorine, chlorine, bromine, or iodine.

Also, the interhalogen compound may include iodine monochloride, iodine monobromide, iodine trichloride, iodine pentafluoride, iodine monofluoride, iodine trifluoride, etc.

Also, the hydrogen halide may include hydrogen fluoride, hydrogen chloride, hydrogen bromide, or hydrogen iodide.

Also, the organic halide may include t-butyl chloride (t-BuCl), t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane (TMSCl), benzoyl chloride, benzoyl bromide, propionyl chloride, propionyl bromide, methyl chloroformate, methyl bromoformate, iodomethane, diiodomethane, triiodomethane (also referred to as "iodoform"), tetraiodomethane, 1-iodopropane, 2-iodopropane, 1,3-diiodopropane, t-butyl iodide, 2,2-dimethyl-1-iodopropane (also referred to as "neopentyl iodide"), allyl iodide, iodobenzene, benzyl iodide, diphenylmethyl iodide, triphenylmethyl iodide, benzylidene iodide (also referred to as "benzal iodide"), trimethylsilyl iodide, triethylsilyl iodide, triphenylsilyl iodide, dimethyldiiodosilane, diethyldiiodosilane, diphenyldiiodosilane, methyltriiodosilane, ethyltriiodosilane, phenyltriiodosilane, benzoyl iodide, propionyl iodide, methyl iodoformate, or the like.

In addition, the nonmetal halide may include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride (SiCl$_4$), silicon tetrabromide, arsenic trichloride, arsenic tribromide, selenium tetrachloride, selenium tetrabromide, tellurium tetrachloride, tellurium tetrabromide, silicon tetraiodide, arsenic triiodide, tellurium tetraiodide, boron triiodide, phosphor triiodide, phosphor oxyiodide, selenium tetraiodide, or the like.

Also, the metal halide may include tin tetrachloride, tin tetrabromide, aluminum trichloride, aluminum tribromide, antimony trichloride, antimony pentachloride, antimony tribromide, aluminum tribromide, gallium trichloride, gallium tribromide, gallium trifluoride, indium trichloride, indium tribromide, indium trifluoride, titanium tetrachloride, titanium tetrabromide, zinc dichloride, zinc dibromide, zinc difluoride, aluminum triiodide, gallium triiodide, indium triiodide, titanium tetraiodide, zinc diiodide, germanium tetraiodide, tin tetraiodide, tin diiodide, antimony triiodide or magnesium diiodide.

Also, the organometallic halide may include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride (EASC), isobutylaluminum sesquichloride, methylmagnesium chloride, methylmagnesium bromide, ethylmagnesium chloride, ethylmagnesium bromide, n-butylmagnesium chloride, n-butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, di-n-butyltin dichloride, di-n-butyltin dibromide, tri-n-butyltin chloride, tri-n-butyltin bromide, methylmagnesium iodide, dimethylaluminum iodide, diethylaluminum iodide, di-n-butylaluminum iodide, diisobutylaluminum iodide, di-n-octylaluminum iodide, methylaluminum diiodide, ethylaluminum diiodide, n-butylaluminum diiodide, isobutylaluminum diiodide, methylaluminum sesquiiodide, ethylaluminum sesquiiodide, isobutylaluminum sesquiiodide, ethylmagnesium iodide, n-butylmagnesium iodide, isobutylmagnesium iodide, phenylmagnesium iodide, benzylmagnesium iodide, trimethyltin iodide, triethyltin iodide, tri-n-butyltin iodide, di-n-butyltin diiodide, di-t-butyltin diiodide, or the like.

In addition, the catalyst composition according to an embodiment of the present invention may include the halide in a molar ratio of 1 mol to 20 mol, more particularly, 1 mol to 5 mol, more particularly, 2 mol to 3 mol with respect to 1 mol of the lanthanide rare earth element-containing compound. If the molar ratio of the halide is greater than 20, the control of catalyst reaction is not easy, and the excessive amount of the halide may induce side reactions.

In addition, the catalyst composition according to an embodiment of the present invention may include non-coordinating anion-containing compound or a non-coordinating anion precursor compound together with the halide instead of the halide.

Particularly, in the compound containing the non-coordinating anion, the non-coordinating anion may be an anion not forming a coordination bond with the active center of a catalyst system due to steric hindrance, and having a sterically large volume, and may be a tetraarylborate anion or a tetraarylborate fluoride anion. In addition, the compound containing the non-coordinating anion may include together with the non-coordinating anion, carbonium cations such as a triaryl carbonium cation; ammonium cations such as N,N-dialkyl anilinium cation, or counter cations such as a phosphonium cation. More particularly, the compound containing the non-coordinating anion may be triphenylcarbonium tetrakis(pentafluorophenyl)borate, N,N-dimethylanilinium tetrakis(pentafluorophenyl)borate, triphenylcarbonium tetrakis[3,5-bis(trifluoromethyl) phenyl]borate, N,N-dimethylanilinium tetrakis[3,5-bis(trifluoromethyl)phenyl]borate, or the like.

In addition, as the non-coordinating anion precursor, triaryl boron compound ($BE_3$, where E is a strongly electron withdrawing aryl group such as a pentafluorophenyl group and a 3,5-bis(trifluoromethyl) phenyl group) may be used as a compound capable of forming a non-coordinating anion under reaction conditions.

(c) Conjugated Diene-Based Monomer

Also, the catalyst composition may further include a conjugated diene-based monomer and may be used as a preforming catalyst composition type obtained by mixing a portion of the conjugated diene-based monomer used in the polymerization reaction with the catalyst composition for polymerization and pre-polymerizing, or a premix catalyst composition type. Then, the activity of the catalyst composition may be improved and the active polymer thus prepared may be stabilized.

In the present invention, the meaning of the "preforming" is as follows. If diisobutylaluminum hydride (DIBAH), etc. is included in a catalyst composition including a lanthanide rare earth element-containing compound, an alkylating agent and a halide, i.e., in a catalyst system, a small amount of a conjugated diene-based monomer such as 1,3-butadiene may be added to decrease the production possibility of diverse active species of the catalyst composition with the DIBAH, and pre-polymerization may be performed in a catalyst composition system with the addition of 1,3-butadiene. In addition, the "premix" may mean a homogeneously mixed state of each compound without forming a polymer in a catalyst composition system.

In this case, the conjugated diene-based monomer used in the catalyst composition may be a partial amount within the total amount range of the conjugated diene-based monomer used in the polymerization reaction, and for example, may be 1 mol to 100 mol, particularly, 10 mol to 50 mol, or 20 mol to 50 mol with respect to 1 mol of the lanthanide rare earth element-containing compound.

The catalyst composition according to an embodiment of the present invention may be prepared by mixing the lanthanide rare earth element-containing compound, the alkylating agent, the halide and at least one conjugated diene-based monomer, particularly, the lanthanide rare earth element-containing compound, the alkylating agent and the halide, and selectively the conjugated diene-based monomer, in an organic solvent.

The organic solvent may be a non-polar solvent having no reactivity with the components constituting the catalyst composition. Particularly, linear, branched or cyclic aliphatic hydrocarbon of 5 to 20 carbon atoms such as n-pentane, n-hexane, n-heptane, n-octane, n-nonane, n-de cane, isopentane, isohexane, isopentane, isooctane, 2,2-dimethylbutane, cyclopentane, cyclohexane, methylcyclopentane and methylcyclohexane; a mixture solvent of aliphatic hydrocarbon of 5 to 20 carbon atoms such as petroleum ether, petroleum spirits, and kerosene; or an aromatic hydrocarbon-based solvent such as benzene, toluene, ethylbenzene, and xylene, and any one or a mixture of two or more thereof may be used. More particularly, the non-polar solvent may be linear, branched or cyclic aliphatic hydrocarbon of 5 to 20 carbon atoms or a mixture solvent of aliphatic hydrocarbon, more particularly, n-hexane, cyclohexane, or a mixture thereof may be used.

In addition, the organic solvent may be appropriately selected according to the kind of the materials constituting the catalyst composition, specifically, the alkylating agent.

In particular, in case where an alkylaluminoxane such as methylaluminoxane (MAO) and ethylaluminoxane is used as the alkylating agent, it is not easily dissolved in an aliphatic hydrocarbon-based solvent, and an aromatic hydrocarbon-based solvent may be appropriately used.

In addition, in case where modified methylaluminoxane is used as the alkylating agent, an aliphatic hydrocarbon-based solvent may be appropriately used. In this case, a single solvent system may be achieved together with an aliphatic hydrocarbon-based solvent such as hexane, which is mainly used as a polymerization solvent, the polymerization reaction may be more favorable. In addition, the aliphatic hydrocarbon-based solvent may promote catalyst activity, and reactivity may be further improved due to such catalyst activity.

Meanwhile, the organic solvent may be used in a molar ratio of 20 mol to 20,000 mol, more particularly, 100 mol to 1,000 mol with respect to 1 mol of the lanthanide rare earth element-containing compound.

Meanwhile, the polymerization in step 1 may be performed in a continuous polymerization type in a polymerization reactor including at least two reactors, or in a batch type reactor.

In addition, the polymerization may be a polymerization with heating, an isothermal polymerization, or a polymerization at a constant temperature (adiabatic polymerization).

Here, the polymerization at a constant temperature means a polymerization method including a step of polymerizing using self-generated heat of reaction without optionally applying heat after adding a catalyst composition, and the polymerization with heating means a polymerization method including injecting the catalyst composition and then, increasing the temperature by optionally applying heat. The isothermal polymerization means a polymerization method by which the temperature of a polymer is kept constant by increasing heat by applying heat or taking heat after adding the catalyst composition.

In addition, the polymerization reaction may be performed by using a coordination anionic polymerization or by a radical polymerization, particularly, a bulk polymerization, a solution polymerization, a suspension polymerization or an emulsion polymerization, more particularly, a solution polymerization.

The polymerization may be performed in a temperature range of −20° C. to 200° C., particularly, 50° C. to 150° C., more particularly, 10° C. to 120° C. or 60° C. to 90° C. for 15 minutes to 3 hours. If the temperature during polymerization is greater than 200° C., it is apprehended that the polymerization reaction may be insufficiently controlled, and the cis-1,4 bond content of the conjugated diene-based polymer thus produced may decrease, and if the temperature is less than −20° C., it is apprehended that a polymerization reaction rate and efficiency may decrease.

In addition, the preparation method of the modified conjugated diene-based polymer according to an embodiment of the present invention may include after preparing the active polymer, a step of terminating polymerizing by further using a reaction terminator for finishing a polymerization reaction such as polyoxyethylene glycol phosphate; or an antioxidant such as 2,6-di-t-butylparacresol. Besides, additives for serving smooth solution polymerization, for example, a chelating agent, a dispersant, a pH controlling agent, a deoxidizer, and an oxygen scavenger may be selectively used together with the reaction terminator.

Step 2 is a step for preparing a first polymer including a functional group by the modification or coupling reaction of the active polymer, and may be performed by reacting the active polymer and the modifier represented by Formula 1. That is, in an embodiment of the present invention, the first polymer may be a modified polymer in which the functional group derived from the modifier is introduced in at least one terminal of a conjugated diene-based polymer chain.

According to an embodiment of the present invention, in Formula 1, $R^1$ to $R^3$ may be each independently a trivalent hydrocarbon group substituted with $-R^6COOR^7$; or an unsubstituted divalent hydrocarbon group of 1 to 10 carbon atoms, where all $R^1$ to $R^3$ may not be trivalent hydrocarbon groups at the same time; or divalent hydrocarbon groups, $R^4$ may be a single bond, an alkylene group of 1 to 20 carbon atoms, $R^5$ may be a silyl group substituted with an alkyl group of 1 to 20 carbon atoms; halogen; a cyano group; or $-COR^8$, $R^6$ may be a single bond, $R^7$ may be an alkyl group of 1 to 20 carbon atoms, and $R^8$ may be one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms and a disilylamino group of 3 to 10 carbon atoms.

In addition, the modifier represented by Formula 1 may be a compound represented by the following Formula 2:

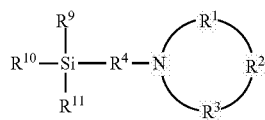

[Formula 2]

In Formula 2, $R^1$ and $R^3$ may be each independently a trivalent hydrocarbon group substituted with one or more substituents selected from the group consisting of a halogen group, an alkyl group of 1 to 20 carbon atoms, a cycloalkyl group of 3 to 20 carbon atoms, and an aryl group of 6 to 30 carbon atoms; or an unsubstituted divalent hydrocarbon group of 1 to 10 carbon atoms, $R^2$ may be a trivalent hydrocarbon group substituted with $-R^6COOR^7$, $R^4$ and $R^6$ may be single bonds, $R^7$ may be an alkyl group of 1 to 20 carbon atoms, or a cycloalkyl group of 3 to 20 carbon atoms, and $R^9$ to $R^{11}$ may be each independently hydrogen or an alkyl group of 1 to 20 carbon atoms.

In another embodiment, in Formula 2, $R^1$ and $R^3$ may be each independently an unsubstituted divalent hydrocarbon group of 1 to 10 carbon atoms, $R^2$ may be a trivalent hydrocarbon group substituted with $-R^6COOR^7$, $R^4$ and $R^6$ may be single bonds, $R^7$ may be an alkyl group of 1 to 20 carbon atoms, and $R^9$ to $R^{11}$ may be each independently an alkyl group of 1 to 20 carbon atoms.

In particular embodiments, the modifier represented by Formula 2 may be one or more selected from the group consisting of the compounds represented by the following Formula 2-1 to Formula 2-3:

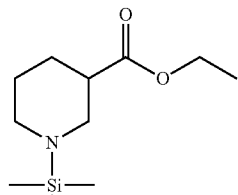

[Formula 2-1]

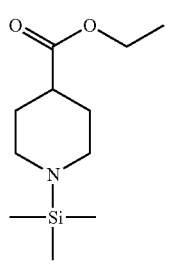

[Formula 2-2]

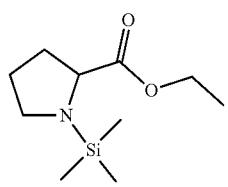

[Formula 2-3]

Meanwhile, the modifier according to an embodiment of the present invention includes a functional group which is capable of improving the affinity with a filler in a molecule, and the compounding properties between a polymer and a filler may be improved. Further, since a cyclic tertiary amine derivative is included as described above, agglomeration among filler particles in a rubber composition may be prevented and the dispersibility of the filler may be improved. For example, if silica that is a kind of an inorganic filler is used as the filler, agglomeration may be easily generated due to the hydrogen bond among hydroxyl groups present at the surface of the silica, but the cyclic tertiary amino group inhibits the hydrogen bond among the hydroxyl groups of the silica, thereby improving the dispersibility of the silica. As described above, the modifier has a structure maximizing the compounding properties of the modified conjugated diene-based polymer, and a modified conjugated diene-based polymer having excellent balance among physical properties such as the abrasion resistance and processability of a rubber composition may be efficiently prepared.

The modifier may be used in a molar ratio of 0.5 mol to 20 mol with respect to 1 mol of the lanthanide rare earth element-containing compound in the catalyst composition. Particularly, the modifier may be used in a molar ratio of 1 mol to 10 mol with respect to 1 mol of the lanthanide rare earth element-containing compound in the catalyst composition.

Also, the modification reaction may be performed at 0° C. to 90° C. for 1 minute to 5 hours.

After finishing the modification reaction, the polymerization reaction may be terminated by adding an isopropanol solution of 2,6-di-t-butyl-p-cresol (BHT) to a polymerization reaction system.

Step 3 is a step for increasing the degree of branching of the first polymer and may be performed by adding a sulfur halide to the first polymer and mixing by stirring for 15 minutes or more, particularly, 15 to 60 minutes.

According to the preparation method according to an embodiment of the present invention, a first polymer including a functional group derived from a modifier is prepared, and the first polymer is mixed with a sulfur halide to perform an electrophilic addition with the double bond in a polymer chain composing the polymer and form a long chain branch in the polymer chain. Accordingly, linearity may decrease and the degree of branching may increase, and as a result, the compounding processability of the modified conjugated diene-based polymer thus prepared may be improved.

The sulfur halide may be used in an amount of 0.1 to 0.3 parts by weight based on 100 parts by weight of the first polymer. If the sulfur halide is used in this ratio, a long chain branch may be easily formed without adversely affecting the polymer chain.

In addition, the sulfur halide may be one or more selected from the group consisting of disulfur dichloride ($S_2Cl_2$), sulfur dichloride ($SCl_2$) and thionyl chloride ($SOCl_2$).

In addition, in Step 3, the mixing may be performed under increased temperature conditions by 5° C. to 20° C. than the polymerization temperature in Step 1. If the mixing in Step 3 is performed under the conditions, the viscosity of a polymer solution during reaction may decrease and the flowing thereof may become favorable, and thus, the branching among polymer chains composing the polymer may be easily increased.

In the preparation method according to an embodiment of the present invention, after Step 3, the modified conjugated diene-based polymer may be obtained via desolventizing treatment such as steam stripping lowering the partial pressure of a solvent via the supply of vapor, or via vacuum drying. In addition, in the reaction product obtained as the result of the reaction, unmodified active polymer may be included together with the modified conjugated diene-based polymer.

In addition, the present invention provides a modified conjugated diene-based polymer prepared by the preparation method. The modified conjugated diene-based polymer according to an embodiment of the present invention is prepared by the preparation method and may have optimized properties including molecular weight distribution, linearity, and mooney viscosity so as to achieve excellent compounding properties and compounding processability.

Particularly, the modified conjugated diene-based polymer may have molecular weight distribution (Mw/Mn) of 2.0 to 3.5.

Particularly, the molecular weight distribution (Mw/Mn) may be 2.5 to 3.5, 2.5 to 3.2, or 2.6 to 3.0.

In the present invention, the molecular weight distribution of a modified conjugated diene-based polymer may be calculated from a ratio (Mw/Mn) of a weight average molecular weight (Mw) to a number average molecular weight (Mn). In this case, the number average molecular weight (Mn) is a common average of an individual polymer molecular weight, which is obtained by measuring the molecular weights of n polymer molecules, obtaining the total of the molecular weights and dividing the total by n. The weight average molecular weight (Mw) shows molecular weight distribution of a polymer composition. All molecular weight average values may be expressed by gram per mol (g/mol). In addition, each of the weight average molecular weight and the number average molecular weight may mean a polystyrene converted molecular weight analyzed by gel permeation chromatography (GPC).

The modified conjugated diene-based polymer according to an embodiment of the present invention may satisfy the above-described molecular weight distribution conditions, and at the same time, may have a weight average molecular weight (Mw) of $3 \times 10^5$ to $1.5 \times 10^6$ g/mol, and a number average molecular weight (Mn) of $1.0 \times 10^5$ to $5.0 \times 10^5$ g/mol. If applied to a rubber composition within the ranges, tensile properties may be excellent and processability may be good, and workability of the rubber composition may be improved and mulling and kneading may become easy, thereby achieving excellent mechanical properties and excellent balance of the physical properties of the rubber composition. The weight average molecular weight may be, for example, from $5 \times 10^5$ to $1.2 \times 10^6$ g/mol, or from $5 \times 10^5$ to $8 \times 10^5$ g/mol, and the number average molecular weight may be, for example, from $1.5 \times 10^5$ to $3.5 \times 10^5$ g/mol, or from $2.0 \times 10^5$ to $2.7 \times 10^5$ g/mol.

More particularly, if the modified conjugated diene-based polymer according to an embodiment of the present invention satisfies the conditions of the molecular weight distribution together with the weight average molecular weight (Mw) and the number average molecular weight at the same time, and when the polymer is applied to a rubber composition, tensile properties, viscoelasticity and processability of the rubber composition may be excellent, and balance among the physical properties may be excellent.

In addition, the modified conjugated diene-based polymer according to an embodiment of the present invention may have linearity (-S/R) at 100° C. of less than 0.6, particularly, from 0.4 to less than 0.6, or from 0.44 to less than 0.58.

The linearity (-S/R; stress/relaxation) represents stress change appearing in response to the strain of the same amount generated in a material, and through the linearity, the degree of branching of the modified conjugated diene-based polymer may be anticipated. For example, it means that if the linearity decreases, the degree of branching increases. In addition, the value represents an absolute value.

Meanwhile, if the linearity is too low, that is, if the degree of branching is too high, the processability when applied to a rubber composition may be improved but rotation resistance may increase and mechanical properties may be deteriorated.

However, since the modified conjugated diene-based polymer according to an embodiment of the present invention has a linearity in the range, both compounding properties such as tensile properties and viscoelasticity and compounding processability may be excellent when applied to a rubber composition.

In addition, the modified conjugated diene-based polymer according to an embodiment of the present invention may have a mooney viscosity (MV) at 100° C. of 20 to 100, particularly, 30 to 80, 35 to 75 or 40 to 70. The modified conjugated diene-based polymer according to the present invention has the mooney viscosity in the above-described range, and may have excellent processability.

In the present invention, the mooney viscosity may be measured by using a mooney viscometer, for example, Large Rotor of MV2000E of Monsanto Co., Ltd. at a rotor speed of 2±0.02 rpm at 100° C. Particularly, a polymer was stood at room temperature (23±5° C.) for 30 minutes or more, and 27±3 g of the specimen was collected and put in a die cavity, and then, Platen was operated to measure the mooney viscosity while applying torque. In addition, the linearity (-S/R) was obtained by measuring the gradient value of the mooney viscosity change appearing during releasing the torque after measuring the mooney viscosity, as an absolute value.

In addition, the conjugated diene-based polymer may have the cis-1,4 bond content of a conjugated diene part, measured by Fourier transform infrared spectroscopy (FT-IR), of 95% or more, more particularly, 98% or more.

Accordingly, the abrasion resistance, cracking resistance and ozone resistance of a rubber composition may be improved when applied to a rubber composition.

In addition, the conjugated diene-based polymer may have the vinyl content of a conjugated diene part, measured by Fourier transform infrared spectroscopy (FT-IR), of 5% or less, more particularly, 2% or less. If the vinyl content in the polymer is greater than 5%, the abrasion resistance, cracking resistance and ozone resistance of a rubber composition including the polymer may be deteriorated.

Here, the cis-1,4 bond content or the vinyl content in a polymer by Fourier transform infrared spectroscopy (FT-IR) each was obtained by measuring FT-IR transmittance spectrum of the carbon disulfide solution of a conjugated diene-based polymer prepared in a concentration of 5 mg/mL with carbon disulfide of the same cell as a blank, and using the maximum peak value (a, base line) around 1130 cm-1, the minimum peak value (b) around 967 cm-1 representing a trans-1,4 bond, the minimum peak value (c) around 911 cm-1 representing a vinyl bond, and minimum peak value (d) around 736 cm-1 representing a cis-1,4 bond in the measured spectrum.

Further, there is provided in the present invention a rubber composition including the modified conjugated diene-based polymer and a molded product manufactured from the rubber composition.

The rubber composition according to an embodiment of the present invention may include the modified conjugated diene-based polymer in an amount of 0.1 wt % to 100 wt %, particularly, 10 wt % to 100 wt %, more particularly, 20 wt % to 90 wt %. If the amount of the modified conjugated diene-based polymer is less than 0.1 wt %, the improving effects of the abrasion resistance and crack resistance of a molded product, for example, a tire may be insignificant.

In addition, the rubber composition may further include another rubber components in addition to the modified conjugated diene-based polymer as necessary, and in this case, the rubber components may be included in an amount of 90 wt % or less with respect to the total weight of the rubber composition. Particularly, the rubber composition may include the rubber components in an amount of 1 part by weight to 900 parts by weight with respect to 100 parts by weight of the modified conjugated diene-based copolymer.

The rubber component may be a natural rubber or a synthetic rubber, for example, a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a polyethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or a mixture of two or more thereof may be used.

In addition, the rubber composition may include 0.1 parts by weight to 150 parts by weight of a filler with respect to 100 parts by weight of the modified conjugated diene-based polymer, and the filler may be silica, carbon black or a combination thereof. Particularly, the filler may be carbon black.

The carbon black filler is not specifically limited but may have a nitrogen adsorption specific surface area of, for example, 20 $m^2/g$ to 250 $m^2/g$ (measured based on $N_2SA$, JIS K 6217-2:2001). Also, the carbon black may have a dibutylphthalate oil absorption amount (DBP) of 80 cc/100 g to 200 cc/100 g. If the nitrogen adsorption specific surface area is greater than 250 $m^2/g$, the processability of a rubber composition may be deteriorated, and if the nitrogen adsorption specific surface area is less than 20 $m^2/g$, reinforcing performance by the carbon black may be insignificant. In addition, if the DBP oil absorption amount of the carbon black is greater than 200 cc/100 g, the processability of the rubber composition may be deteriorated, and if the DBP oil absorption amount is less than 80 cc/100 g, reinforcing performance by the carbon black may be insignificant.

In addition, the silica is not specifically limited, and may include, for example, wet silica (hydrated silica), dry silica (anhydrous silicate), calcium silicate, aluminum silicate or colloid silica. Particularly, the silica may be wet silica which has the most remarkable compatibility effect of the improving effect of destruction characteristics and wet grip. In addition, the silica may have nitrogen absorption specific surface area (nitrogen surface area per gram, $N_2SA$) of 120 $m^2/g$ to 180 $m^2/g$, and cetyl trimethyl ammonium bromide (CTAB) absorption specific surface area of 100 $m^2/g$ to 200 $m^2/g$. If the nitrogen absorption specific surface area is less than 120 $m^2/g$, the reinforcing performance due to silica may be deteriorated, and if the nitrogen absorption specific surface area is greater than 180 $m^2/g$, the processability of the rubber composition may be deteriorated. In addition, if the CTAB absorption specific surface area of the silica is less than 100 $m^2/g$, the reinforcing performance by the silica filler may be deteriorated, and if the CTAB absorption specific surface area is greater than 200 $m^2/g$, the processability of the rubber composition may be deteriorated.

Meanwhile, if the silica is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl) trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl) tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and one among them or a mixture of two or more thereof may be used. More particularly, the silane coupling agent may be bis(3-triethoxysilylpropyl)polysulfide or 3-trimethoxysilylpropylbenzothiazyltetrasulfide in consideration of the improving effect of reinforcing properties.

In addition, the rubber composition according to an embodiment of the present invention may be sulfur cross-linkable, and so may further include a vulcanizing agent.

The vulcanizing agent may be particularly a sulfur powder and may be included in an amount of 0.1 parts by weight to 10 parts by weight with respect to 100 parts by weight of the rubber component. With the amount used in the above range, elasticity and strength required for a vulcanized rubber composition may be secured, and at the same time, a low fuel consumption ratio may be attained.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, a thermoplastic resin, or the like.

The vulcanization accelerator is not specifically limited, and may particularly include thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in an amount of 0.1 parts by weight to 5 parts by weight with respect to 100 parts by weight of the rubber component.

The process oil acts as a softener in a rubber composition and may particularly include a paraffin-based, naphthene-based, or aromatic compound. More particularly, an aromatic process oil may be used in consideration of tensile strength and abrasion resistance, and a naphthene-based or paraffin-based process oil may be used in consideration of hysteresis loss and properties at low temperature. The process oil may be included in an amount of 100 parts by weight or less with respect to 100 parts by weight of the rubber component. With the above-described amount in the range, the deterioration of tensile strength and low exothermic properties (low fuel consumption ratio) of a vulcanized rubber may be prevented.

The antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature. The antiaging agent may be used in an amount of 0.1 parts by weight to 6 parts by weight with respect to 100 parts by weight of the rubber component.

The rubber composition according to an embodiment of the present invention may be obtained by mulling using a mulling apparatus such as a banbury mixer, a roll, and an internal mixer according to a mixing prescription. In addition, a rubber composition having low exothermic properties and excellent abrasion resistance may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

The molded product manufactured by using the rubber composition may include a tire or a tire tread.

Hereinafter, the present invention will be explained in particular referring to embodiments and experimental embodiments. However, the embodiments and experimental embodiments below are only for illustrating the present invention, and the scope of the present invention is not limited thereto.

Preparation Example: Preparation of ethyl 1-(trimethylsilyl)piperidine-4-carboxylate To a solution in which 2 g of ethyl piperidine-4-carboxylate was dissolved in dichloromethane ($CH_2Cl_2$), 1.77 ml of triethylamine ($Et_3N$) and 1.62 ml of trimethylsilyl chloride (TMSCl) were added at 0° C., and the reaction mixture was stirred at 0° C. for 5 hours. Then, solvents in the solution thus obtained was evaporated under a reduced pressure, and the resultant product was re-dissolved in hexane and filtered to obtain a compound having a structure below, and then, $^1H$ nuclear magnetic resonance spectroscopic spectrum was observed.

(i)

$^1H$ NMR (500 MHz, $CDCl_3$) δ 4.11-4.08 (m, 2H), δ 3.13-3.11 (m, 2H), δ 2.61-2.54 (m, 2H), δ 2.34-2.32 (m, 1H), δ 1.74 (m, 2H), δ 1.42 (m, 2H), δ 1.23-1.22 (m, 3H), δ 0.05-0.00 (m, 9H).

Example 1

To a 20 L autoclave reactor, 550 g of 1,3-butadiene, 3681 g of n-hexane were added, and the internal temperature of the reactor was elevated to 70° C. A catalyst composition was added thereto, and polymerization was performed for 60 minutes. In this case, the catalyst composition was prepared by adding 0.715 mmol of neodymium versatate (Nd(2-ethylhexanoate)$_3$, Solvay Co.) to a n-hexane solvent, injecting diisobutylaluminum hydride (DIBAH) and diethylaluminum chloride (DEAC) one by one, in a molar ratio satisfying neodymium versatate:DIBAH:DEAC=1:9.5:2.4, and mixing. After adding the compound of Formula (i) prepared in the Preparation Example, a modification reaction was performed for 30 minutes (modifier:Nd=5:1 eq.). Then, HPSS (HPSS-81, IC Chemical) as a polymerization terminator and Wingstay-K as an antioxidant were added in amounts of 0.15 parts by weight and 0.4 parts by weight, respectively, with respect to 100 parts by weight of the monomer to prepare a first polymer. Then, the internal temperature of the reactor was elevated to 80° C., and disulfur dichloride ($S_2Cl_2$) was added and stirred for 15 minutes to mix with the first polymer. In this case, the disulfur dichloride was added in an amount of 0.1 parts by weight with respect to 100 parts by weight of the first polymer. Then, solvents were removed via steam stripping, drying was performed for 4 minutes using a 6-inch hot roll (110° C.) to prepare a modified butadiene polymer.

Example 2

A modified butadiene polymer was prepared by performing the same method as in Example 1 except for adding the disulfur dichloride and mixing with the first polymer by stirring for 60 minutes in Example 1.

Example 3

A modified butadiene polymer was prepared by performing the same method as in Example 1 except for adding the disulfur dichloride and mixing with the first polymer by stirring for 80 minutes in Example 1.

Example 4

A modified butadiene polymer was prepared by performing the same method as in Example 1 except for adding 0.769 mmol of neodymium versatate during preparing the catalyst composition, and adding 0.30 parts by weight of the disulfur dichloride with respect to 100 parts by weight of the monomer in Example 1.

Example 5

A modified butadiene polymer was prepared by performing the same method as in Example 4 except for adding 0.32 parts by weight of the disulfur dichloride with respect to 100 parts by weight of the monomer in Example 4.

Comparative Example 1

BR1208 (LG Chem, Ltd.) was used as an unmodified butadiene polymer.

Comparative Example 2

CB25 (Lanxess Co.) was used as an unmodified butadiene polymer.

Comparative Example 3

To a 20 L autoclave reactor, 550 g of 1,3-butadiene, 3681 g of n-hexane were added, and the internal temperature of the reactor was elevated to 70° C. A catalyst composition was added thereto, and polymerization was performed for 60 minutes. In this case, the catalyst composition was prepared by adding 0.715 mmol of neodymium versatate (Solvay Co.) to a n-hexane solvent, injecting diisobutylaluminum hydride (DIBAH) and diethylaluminum chloride (DEAC) one by one, in a molar ratio satisfying neodymium versatate:DIBAH:DEAC=1:9.5:2.4, and mixing. After adding the compound of Formula (i) prepared in the Preparation Example, a modification reaction was performed for 30 minutes (modifier:Nd=5:1 eq.). Then, HPSS as a polymerization terminator and Wingstay-K as an antioxidant were added by 0.15 parts by weight and 0.4 parts by weight, respectively, with respect to 100 parts by weight of the monomer. Then, solvents were removed via steam stripping, drying was performed for 4 minutes using a 6-inch hot roll (110° C.) to prepare a modified butadiene polymer.

Comparative Example 4

A modified butadiene polymer was prepared by performing the same method as in Example 1 except for adding the disulfur dichloride and mixing with the first polymer by stirring for 5 minutes in Example 1.

Experimental Example 1

With respect to each of the polymers prepared in the Examples and the Comparative Examples, each of physical properties was measured and the results are listed in Table 1 below.

1) Analysis of Microstructure

The cis, trans and vinyl bond contents in each polymer were measured using Varian VNMRS 500 MHz NMR, and 1,1,2,2-tetrachloroethane D2 (Cambridge Isotope Co.) was used as a solvent.

2) Weight Average Molecular Weight (Mw), Number Average Molecular Weight (Mn) and Molecular Weight Distribution (MWD)

Each polymer was dissolved in tetrahydrofuran (THF) under 40° C. conditions for 30 minutes, loaded on gel permeation chromatography (GPC) and flowed. In this case, two columns of PLgel Olexis (trade name, Polymer Laboratories Co. Ltd.) and one column of PLgel mixed-C were used in combination. Also, newly replaced columns were all mixed bed type columns, and polystyrene was used as a GPC standard material.

3) Mooney Viscosity (RP, Raw Polymer) and -S/R Value

The mooney viscosity (ML1+4, @100° C.) (MU) was measured by using MV2000E of Monsanto Co using Large Rotor at a rotor speed of 2±0.02 rpm conditions at 100° C. In this case, a specimen used was stood at room temperature (23±3° C.) for 30 minutes or more, and 27±3 g of the specimen was collected and put in a die cavity, and then, Platen was operated and the mooney viscosity was measured while applying torque. In addition, after measuring the mooney viscosity, the change of the mooney viscosity appearing while releasing torque was observed for 1 minute, and -S/R value was determined from the gradient value thereof.

TABLE 1

| | Division | Example | | | | | Comparative Example | | | |
|---|---|---|---|---|---|---|---|---|---|---|
| | | 1 | 2 | 3 | 4 | 5 | 1 | 2 | 3 | 4 |
| | Microstructure (cis:vinyl:trans) | 97.4:0.5:2.2 | 96.9:1.0:2.1 | 96.5:1.0:2.5 | 96.6:0.9:2.5 | 96.8:0.9:2.3 | — | — | 97.6:0.5:2.0 | 96.9:1.0:2.1 |
| GPC result | Mn ($\times 10^5$ g/mol) | 2.34 | 2.30 | 2.30 | 2.22 | 2.21 | — | — | 2.44 | 2.42 |
| | Mw ($\times 10^5$ g/mol) | 6.41 | 6.48 | 6.50 | 6.36 | 6.37 | — | — | 6.26 | 6.28 |
| | MWD (Mw/Mn) | 2.73 | 2.81 | 2.83 | 2.86 | 2.88 | — | — | 2.57 | 2.60 |
| | Mooney viscosity (RP) (ML1 + 4, @100° C.) (MU) | 51 | 53 | 53 | 48 | 52 | 45 | 45 | 49 | 51 |
| | -S/R | 0.5782 | 0.5324 | 0.4355 | 0.4709 | 0.4342 | 0.7274 | 0.6585 | 0.7600 | 0.6841 |

As shown in Table 1, the modified conjugated diene-based polymers of Example 1 to Example 5 according to embodiments of the present invention showed -S/R values of less than 0.6 that were markedly lower than the polymers of Comparative Example 1 to Comparative Example 4. These results mean that the modified conjugated diene-based polymer according to an embodiment of the present invention has a high degree of branching.

Experimental Example 2

A rubber composition and a rubber specimen were manufactured using each of the polymers prepared in Example 1 to Example 5 and Comparative Example 1 to Comparative Example 4, and mooney viscosity, tensile strength, 300% modulus, elongation ratio and viscoelasticity properties (rotation resistance) were measured. The results are listed in Table 2 below.

Particularly, each rubber composition was prepared by compounding 100 parts by weight of each polymer with 70 parts by weight of carbon black, 22.5 parts by weight of a process oil, 2 parts by weight of an antiaging agent (TMDQ), 3 parts by weight of zinc white (ZnO), and 2 parts by weight of stearic acid. Then, to each rubber composition, 2 parts by weight of sulfur, 2 parts by weight of a vulcanizing accelerator (CZ) and 0.5 parts by weight of a vulcanization accelerator (DPG) were added and gently mixed at 50° C. for 1.5 minutes in 50 rpm. Then, by using a roll of 50° C., a vulcanized compounding product having a sheet shape was obtained. The vulcanized compounding product was vulcanized at 160° C. for 25 minutes to manufacture a rubber specimen.

1) Mooney Viscosity (FMB, Final Master Batch)

The mooney viscosity (ML1+4, @100° C.) (MU) was measured by using each vulcanized compounding product thus manufactured. Particularly, the mooney viscosity (MV) was measured by using MV2000E of Monsanto Co. using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated and the mooney viscosity was measured while applying torque.

2) Tensile Strength (kg·f/cm$^2$), 300% Modulus (kg·f/cm$^2$) and Elongation Ratio After vulcanizing each rubber composition at 150° C. for t90 minutes, the tensile strength, the modulus when elongated by 300% (M-300%) and the elongation ratio of the vulcanized product when breaking were measured according to an ASTM D412. The measured values were indexed by calculating by Mathematical Formula 1 below, with the resultant value of Comparative Example 2 as 100.

Index=(measured value/standard value)*100  [Mathematical Formula 1]

3) Viscoelasticity Properties (Tan δ @60° C.)

Tan δ properties that are the major factors of a low fuel consumption properties were measured as viscoelasticity coefficient (Tan δ) at a frequency of 10 Hz, prestrain of 3%, and dynamic strain of 3% at 60° C. by using DMTS 500N of Gabo Co., Germany. In this case, the Tan δ value represents rotation resistance property fuel consumption ratio at 60° C. The measured values were indexed by calculating by Mathematical Formula 2 below, with the resultant value of Comparative Example 2 as 100.

Index=(standard value/measured value)*100  [Mathematical Equation 2]

TABLE 2

| Division | | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|---|
| Mooney viscosity (FMB) | | 67 | 69 | 68 | 63 | 66 | 63 | 60 | 72 | 73 |
| ΔMV | | 16 | 16 | 15 | 15 | 14 | 18 | 15 | 23 | 22 |
| Tensile properties | M-300% | 109 | 108 | 107 | 105 | 105 | 93 | 100 | 110 | 109 |
| | Tensile strength | 101 | 100 | 101 | 98 | 96 | 94 | 100 | 102 | 100 |
| | Elongation ratio | 93 | 92 | 95 | 95 | 97 | 101 | 100 | 93 | 94 |
| Viscoelasticity properties | Tan δ @ 60° C. | 110 | 109 | 102 | 106 | 99 | 88 | 100 | 110 | 110 |

* The difference of mooney viscosity (ΔMV) is a value obtained by subtracting the mooney viscosity (RP) in Table 1 from the mooney viscosity (FMB), the smaller the difference is, the better, the processability is.

As shown in Table 2, the rubber specimens manufactured from the rubber compositions including Example 1 to Example 5 according to embodiments of the present invention, showed excellent tensile properties and viscoelasticity properties and improved processability when compared with those of Comparative Example 1 to Comparative Example 4.

Particularly, each rubber specimen manufactured from the rubber composition including each polymer of Comparative Example 3 and Comparative Example 4 showed similar tensile properties and viscoelasticity properties but decreased processability when compared with Example 1. Through this, the preparation method according to an embodiment of the present invention includes a step of adding a sulfur halide and mixing for 15 minutes or more, and a polymer having high degree of branching may be obtained, and compounding properties such as tensile properties and viscoelasticity properties may be excellent and compounding processability may be improved at the same time.

Meanwhile, Example 3 and Example 5 had decreased viscoelasticity properties when compared with Example 1, Example 2 and Example 4. Each of Example 3 and Example 5 was prepared by adding sulfur halide and mixing for 80 minutes, or adding 0.32 parts by weight sulfur halide with respect to 100 parts by weight of a first polymer, and showed a -S/R value of less than 0.44 as shown in Table 1. Through this, it was found that compounding properties and compounding processability might be improved even further if the amount used of the sulfur halide and mixing time were controlled during preparing a modified conjugated diene-based polymer.

The invention claimed is:
1. A method for preparing a modified conjugated diene-based polymer, the method comprising:
polymerizing a conjugated diene-based monomer in the presence of a catalyst composition in a hydrocarbon solvent to prepare an active polymer;
reacting the active polymer with a modifier represented by the following Formula 1 to prepare a first polymer; and
adding a sulfur halide to the first polymer and mixing for 15 minutes or more:

[Formula 1]

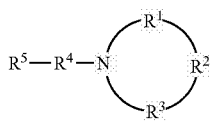

in Formula 1,
$R^1$ to $R^3$ are each independently a trivalent hydrocarbon group or an unsubstituted divalent hydrocarbon group, wherein the trivalent hydrocarbon group is substituted with one or more substituents selected from the group consisting of a halogen group, an alkyl group of 1 to 20 carbon atoms, a cycloalkyl group of 3 to 20 carbon atoms, an aryl group of 6 to 30 carbon atoms, and —$R^6COOR^7$, and wherein the unsubstituted divalent hydrocarbon group has 1 to 10 carbon atoms, where all $R^1$ to $R^3$ are not trivalent hydrocarbon groups; or unsubstituted divalent hydrocarbon groups at the same time,
$R^4$ is a single bond, an alkylene group of 1 to 20 carbon atoms, or a cycloalkylene group of 3 to 20 carbon atoms,
$R^5$ is a silyl group, halogen, a cyano group, or —$COR^8$, wherein the silyl group is unsubstituted or substituted with an alkyl group of 1 to 20 carbon atoms,
$R^6$ is a single bond, an alkylene group of 1 to 20 carbon atoms, or a cycloalkylene group of 3 to 20 carbon atoms,
$R^7$ is an alkyl group of 1 to 20 carbon atoms, or a cycloalkyl group of 3 to 20 carbon atoms,
and $R^8$ is one selected from the group consisting of an alkoxy group of 1 to 10 carbon atoms, an aryl group of 6 to 30 carbon atoms, a heteroaryl group of 2 to 30 carbon atoms, a heterocycloalkyl group of 2 to 10 carbon atoms, a heteroamine group of 2 to 10 carbon atoms, and a disilylamino group of 3 to 10 carbon atoms.

2. The method for preparing a modified conjugated diene-based polymer of claim 1, wherein the sulfur halide is added in an amount of 0.1 parts by weight to 0.3 parts by weight with respect to 100 parts by weight of the first polymer.

3. The method for preparing a modified conjugated diene-based polymer of claim 1, wherein the mixing of the sulfur halide and the first polymer further comprises:
stirring for 15 minutes to 60 minutes.

4. The method for preparing a modified conjugated diene-based polymer of claim 1, wherein the sulfur halide is one or more selected from the group consisting of disulfur dichloride, sulfur dichloride and thionyl chloride.

5. The method for preparing a modified conjugated diene-based polymer of claim 1, wherein the mixing of the sulfur halide and the first polymer is performed at a temperature that is 5° C. to 20° C. greater with respect to a temperature used to prepare the active polymer.

6. The method for preparing a modified conjugated diene-based polymer of claim 1, wherein the polymerization to prepare the active polymer is performed at a temperature of 50° C. to 100° C.

7. The method for preparing a modified conjugated diene-based polymer of claim 1, wherein in the modifier represented by Formula 1,

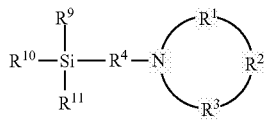

$R^1$ and $R^3$ are each independently a trivalent hydrocarbon group or an unsubstituted divalent hydrocarbon group, wherein the trivalent hydrocarbon group is substituted with one or more substituents selected from the group consisting of a halogen group, an alkyl group of 1 to 20 carbon atoms, a cycloalkyl group of 3 to 20 carbon atoms, and an aryl group of 6 to 30 carbon atoms, and wherein the unsubstituted divalent hydrocarbon group has 1 to 10 carbon atoms,
$R^2$ is a trivalent hydrocarbon group substituted with —$R^6COOR^7$,
$R^5$ is,

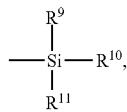

$R^4$ and $R^6$ are single bonds, and
$R^9$ to $R^{11}$ are each independently hydrogen or an alkyl group of 1 to 20 carbon atoms.

8. The method for preparing a modified conjugated diene-based polymer of claim 1, wherein the modifier represented by Formula 1 is one selected from the group consisting of the compounds represented by the following Formula 2-1 to Formula 2-3:

[Formula 2-1]

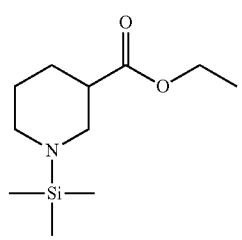

[Formula 2-2]

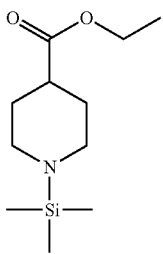

[Formula 2-3]

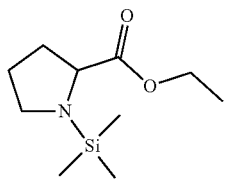

9. The method for preparing a modified conjugated diene-based polymer of claim 1, wherein the catalyst composition comprises a lanthanide rare earth element-containing compound.

10. The method for preparing a modified conjugated diene-based polymer of claim 9, wherein the lanthanide rare earth element-containing compound comprises a neodymium compound represented by the following Formula 3:

[Formula 3]

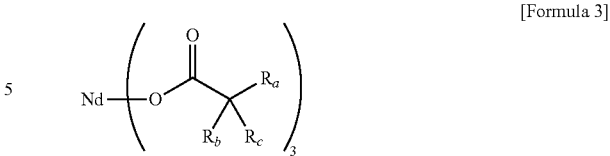

in Formula 3,
$R_a$ to $R_c$ are each independently hydrogen or an alkyl group of 1 to 12 carbon atoms, where all $R_a$ to $R_c$ are not hydrogen at the same time.

11. The method for preparing a modified conjugated diene-based polymer of claim 10, wherein the neodymium compound is one or more selected from the group consisting of Nd(2-ethylhexanoate)$_3$, Nd(2,2-dimethyl decanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexyl nonanoate)$_3$, Nd(2-ethyl-2-propyl nonanoate)$_3$ and Nd(2-ethyl-2-hexyl nonanoate)$_3$.

12. The method for preparing a modified conjugated diene-based polymer of claim 1, wherein the catalyst composition comprises at least one of an alkylating agent, a halide and a conjugated diene-based monomer.

* * * * *